April 18, 1967  TSUNEO NAKAHARA ET AL  3,315,187
MICROWAVE TRANSMISSION LINE
Filed Jan. 25, 1966  5 Sheets-Sheet 5

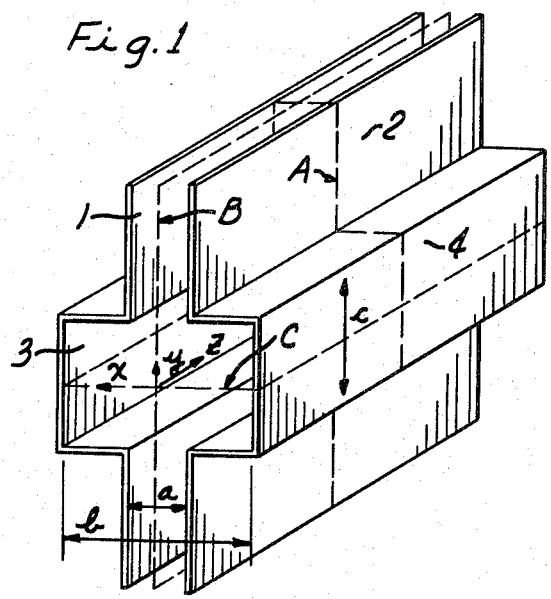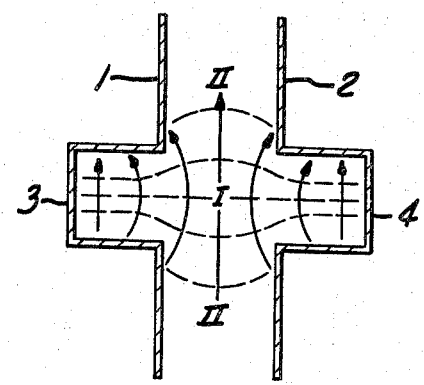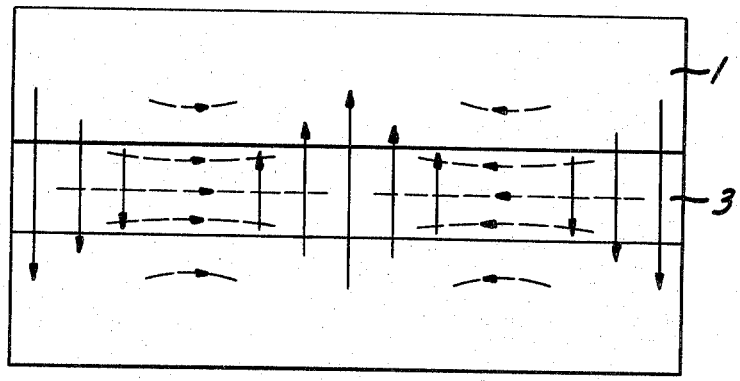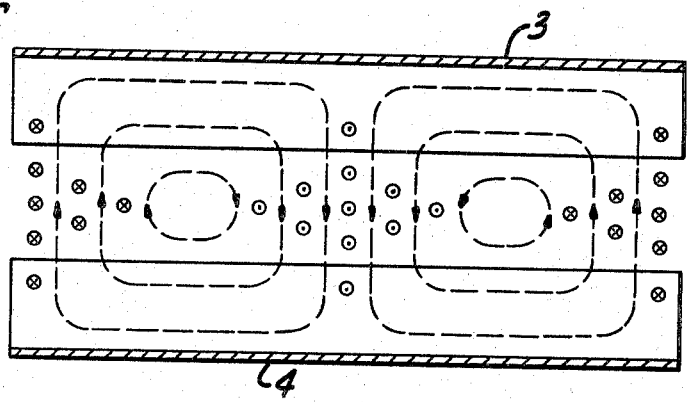

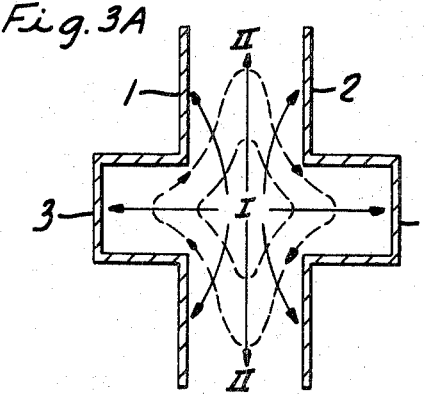
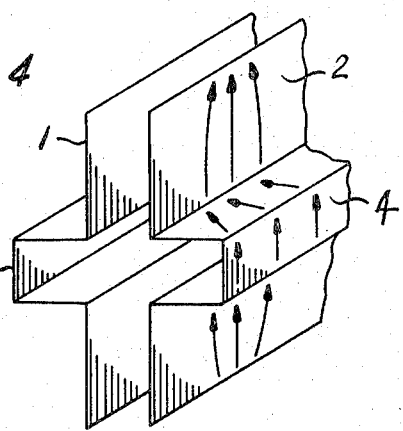
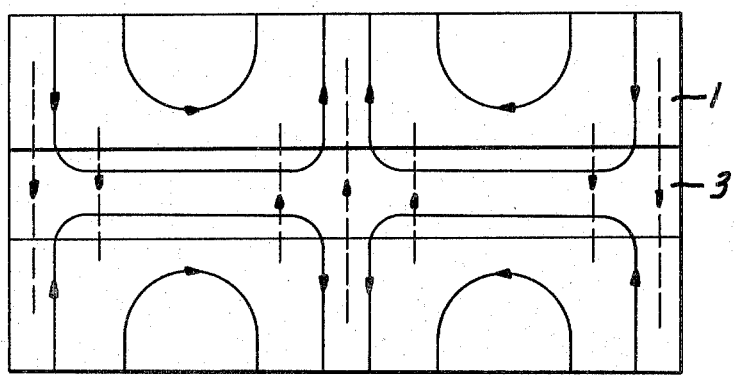
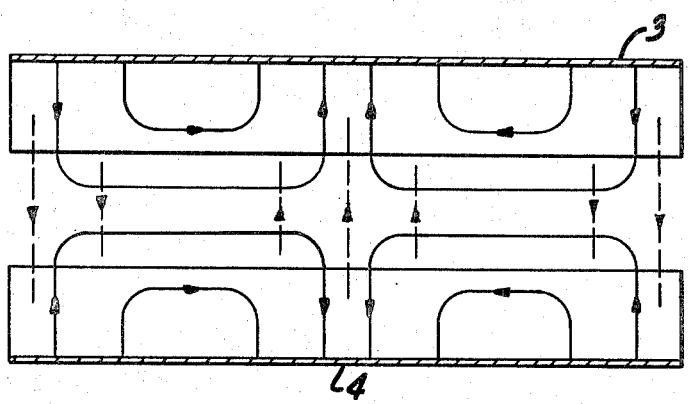

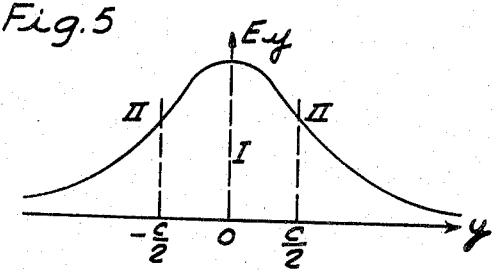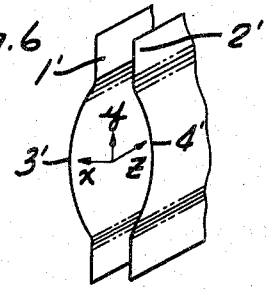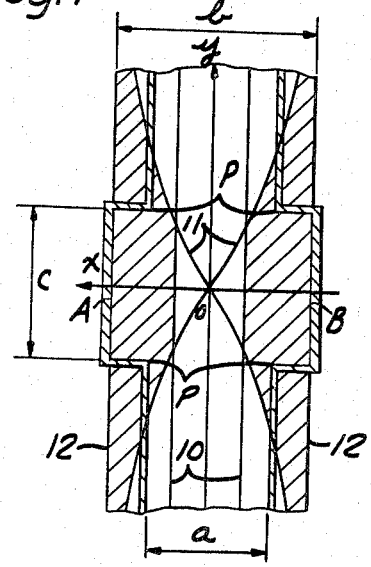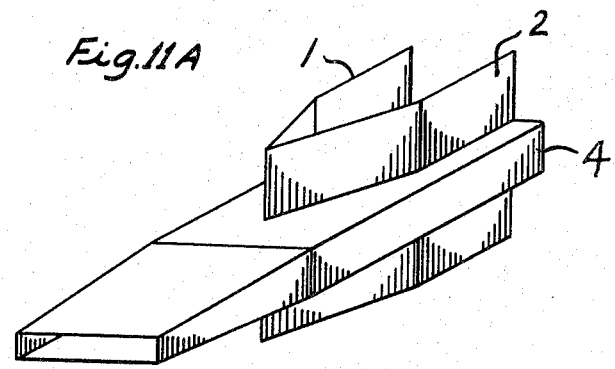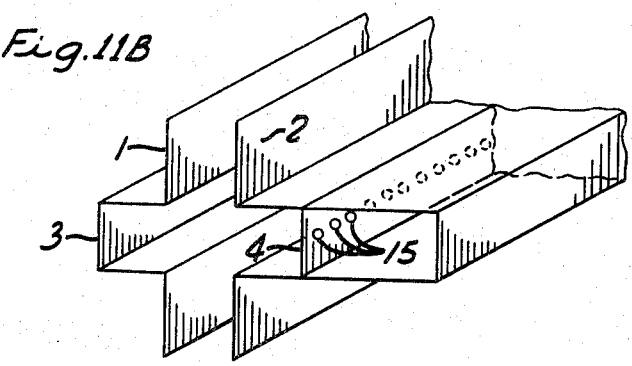

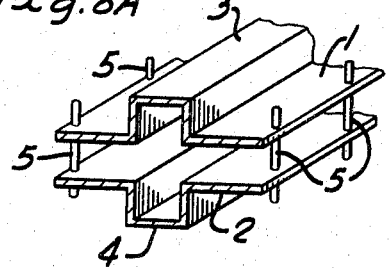
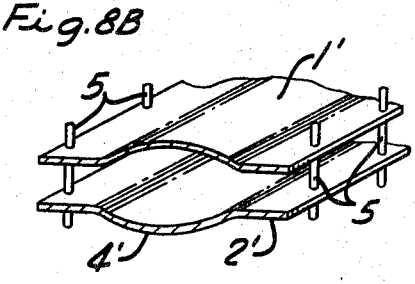
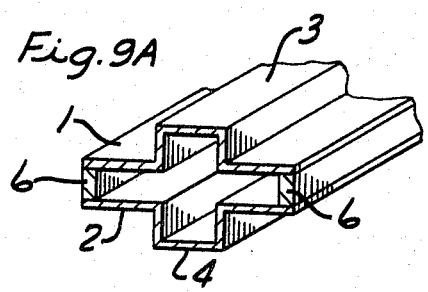
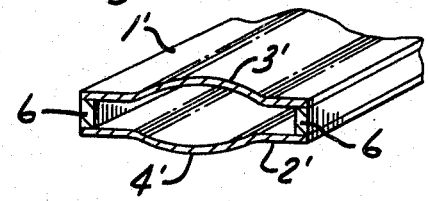
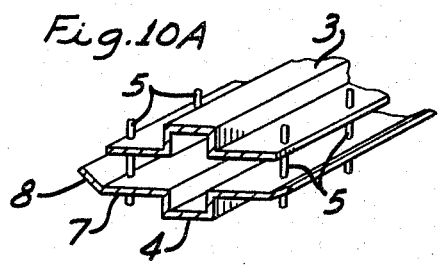
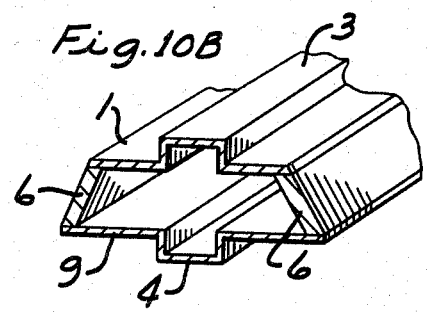

INVENTORS
TSUNEO NAKAHARA &
NORITAKA KURAUCHI
BY
CAROTHERS & CAROTHERS
THEIR ATTORNEYS

United States Patent Office 3,315,187
Patented Apr. 18, 1967

3,315,187
MICROWAVE TRANSMISSION LINE
Tsuneo Nakahara, Nishinomiya-shi, and Noritaka Kurauchi, Suita-shi, Japan, assignors to Sumitomo Electric Industries, Ltd.
Filed Jan. 25, 1966, Ser. No. 522,966
19 Claims. (Cl. 333—95)

This application is a continuation-in-part of application Ser. No. 333,438, filed Dec. 26, 1963, now abandoned, for Microwave Transmission Line.

This invention relates to a microwave transmission line which transmits surface waves.

A principal object of this invention is to provide a line which will transmit a microwave with a low loss by transmitting it in the form of surface wave.

A second object of this invention is to provide a microwave transmission line which transmits only $TE_{11}$ and $TM_{11}$ modes which are the fundamental modes.

Another object is the provision of a device to support the metal plates which constitute the transmission line of this invention.

Still another object of the invention is the provision of a microwave transmission line which transmits a microwave and simultaneously radiates a part of it outwards.

The microwave transmission line of this invention which attains the above-mentioned objects is characterized in that two sheets of metal plates are provided whose distance from each other in the section normal to the direction of transmission is different at various positions. These plates are placed opposed to each other and a polarized wave having its electric field in parallel to them is transmitted in the form of a surface wave.

Another characteristic of this invention is that the aforementioned two sheets of metal plates are formed and positioned symmetrically.

This invention is further characterized in that in the aforementioned microwave transmission line, angular channelled or grooved parallel metal plates are used for the two sheets of metal plates which are constructed such that only the fundamental modes of the $TE_{11}$ and $TM_{11}$ modes are transmitted by limiting the ratios of the distance between the plates at the groove region and the distance between the plates at the narrower parallel plate region and the width of the angular channel or groove.

Still another characteristic of this invention is that in the microwave transmission line comprising this invention, the two sheets of metal plates are supported in spaced relation from each other with a dielectric material at intervals or continuously.

If the width of the narrower parallel metal plates of the transmission line of this invention is finite, a part of the energy is radiated outwards. A characteristic of this invention is that the control of the radiation directivity to the outside for leaky waveguide applications is accomplished by adopting an asymmetrical structure near the edges of the plates.

Other objects and advantages appear hereinafter in the following description and claims.

The accompanying drawings show for the purpose of exemplification, without limiting this invention or the claims thereto, certain practical embodiments illustrating the principles of this invention wherein:

FIG. 1 is a perspective view illustrating fundamental embodiments of the microwave transmission line of this invention with rectangular grooved channels.

FIG. 2A is a diagrammatic view illustrating the electric and magnetic field distributions for the $TE_{11}$ mode as seen in the sectional plane A of the transmission line of FIG. 1.

FIG. 2B is a diagrammatic view illustrating the electric and magnetic field distributions for the $TE_{11}$ mode as seen in the sectional plane B of the transmission line of FIG. 1.

FIG. 2C is a diagrammatic view illustrating the electric and magnetic field distributions for the $TE_{11}$ mode as seen in the sectional plane C of the transmission line of FIG. 1.

FIG. 3A is a diagrammatic view illustrating the electric and magnetic field distributions for the $TM_{11}$ mode as seen in the sectional plane A of the transmission line of FIG. 1.

FIG. 3B is a diagrammatic view illustrating the electric and magnetic field distributions for the $TM_{11}$ mode as seen in the sectional plane B of the transmission line of FIG. 1.

FIG. 3C is a diagrammatic view illustrating the electric and magnetic field distributions for the $TM_{11}$ mode as seen in the sectional plane C of the transmission line of FIG. 1.

FIG. 4 is a perspective view of an embodiment of the microwave transmission line of this invention illustrating the current flow in the walls for the $TE_{11}$ mode.

FIG. 5 graphically illustrates the distribution of the magnitude of the electric field in the $y$ direction as a function of distance along the $y$ axis.

FIG. 6 is a perspective view of an embodiment of the microwave transmission line of this invention with curved grooves or channels.

FIG. 7 is a graphical plot of certain equations illustrating fundamental embodiments of this invention.

FIG. 8A is a perspective view illustrating a supporting device for the conductor plates of the microwave transmission line of the present invention.

FIG. 8B is a perspective view illustrating another embodiment of the microwave transmission line shown in FIG. 8A.

FIG. 9A is a perspective view of the microwave transmisssion line of the present invention illustrating structural variation in the supporting devices of the transmission line shown in FIG. 8A.

FIG. 9B is a perspective view of the microwave transmission line of the present invention illustrating structural variation in the supporting devices of the transmission line shown in FIG. 8B.

FIG. 10A is a perspective view of the microwave transmission line of the present invention with asymmetrical conductor plates for control of leaky waveguide transmission.

FIG. 10B is a perspective view of the microwave transmission of the present invention illustrating a structural variation of the transmission line shown in FIG. 10A.

FIG. 11A is a perspective view of a launcher for the excitation of the $TE_{11}$ mode in the microwave transmission line of the present invention forming a conventional rectangular waveguide.

FIG. 11B is a perspective view of a launcher illustrating a structural variation of the launcher shown in FIG. 11A.

Figure 12A:
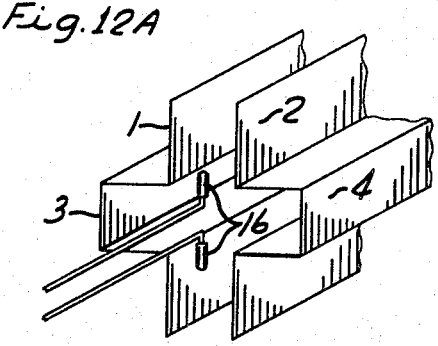

FIG. 12A is a perspective view illustrating the method of launching the $TE_{11}$ mode in the transmission line of the present invention by the use of a dipole antenna.

Figure 12B:
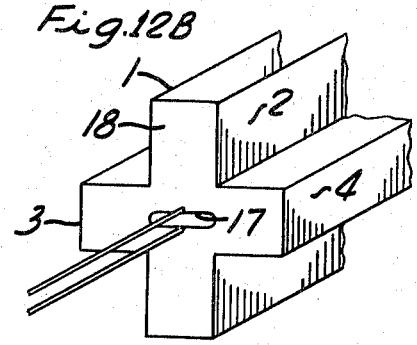

FIG. 12B is a perspective view illustrating the method of exciting the $TE_{11}$ mode in the waveguide of the present invention by the use of parallel conductors.

Figure 13A:
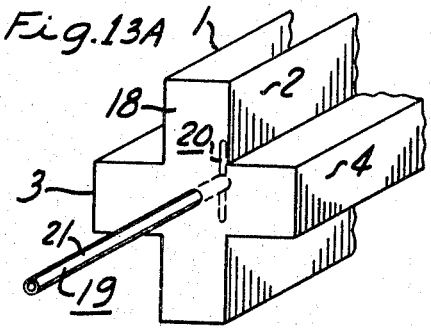

FIG. 13A is a perspective view of a method of exciting the $TE_{11}$ mode in the transmission line of the present invention from a coaxial cable.

Figure 13B:
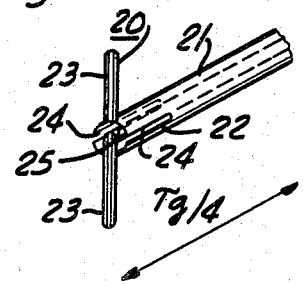

FIG. 13B is a blown up perspective view of the dipole antenna shown in FIG. 13A.

Figure 14:
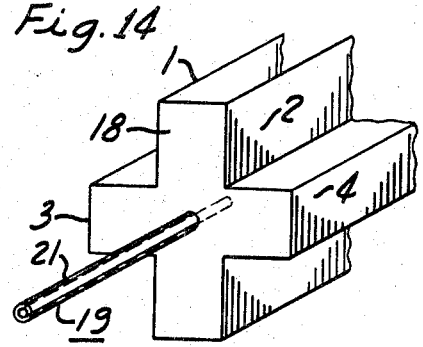

FIG. 14 is a perspective view illustrating a method of launching the $TM_{11}$ mode in the microwave transmission line of the present invention by the use of a coaxial cable.

FIG. 1 shows a fundamental embodiment of the microwave transmission line of this invention in which rectangularly grooved parallel metal plates are used. 1 and 2 denote metal plates having rectangular grooves 3 and 4 respectively, and these metal plates are positioned symmetrical and parallel to the y-axis. The distance between the two sheets of parallel metal plates 1 and 2 and the grooves 3 and 4 is different as shown by $a$ and $b$ in a section normal to the transmission direction of the line. Distance $a$ should be smaller than $b$ in order to satisfy the properties of this invention. In the figure, $c$ denotes the width of the rectangular grooves 3 and 4 provided in the metal plates 1 and 2.

Here we call the region I near the grooves the groove region and region II at the parallel plates, the parallel plate region. The plates are assumed to be infinitely wide in the y-direction. But the field of the modes in consideration attenuates exponential in the y-direction as will be shown below. The width may be finite in practice.

FIG. 2 illustrates the electric and magnetic field distributions of the fundamental mode among the TE$mn$ modes at the time the electric field is excited in the y-direction in the transmission line of FIG. 1. In the transmission line of FIG. 1 the distribution of the magnitude of the electric field E$y$ of the TE$_{11}$ mode on the y-axis will be represented by a curve as shown in FIG. 5.

FIGS. 2A, B and C illustrate the field distributions of the TE$_{11}$ mode as seen in planes A, B and C respectively in the microwave transmission line of FIG. 1. The solid lines represent the electric field distribution or E lines and the dashed lines represent the magnetic field distribution or H lines. The E lines vary in length thereby representing the variance in magnitude of the electric field in the y-direction or E$y$. The field distributions of the fundamental TE$_{11}$ mode of this microwave transmission line are similar to that of the TE$_{10}$ mode in a rectangular waveguide.

FIG. 4 illustrates the flow of current in the walls of the transmission line of FIG. 1 when excited with the TE$_{11}$ mode of FIG. 2. The current flow or I lines are represented by the arrows.

FIGS. 3A, B and C similarly illustrate the field distributions of the fundamental TM$_{11}$ mode as seen in the respective A, B and C planes of the microwave transmission line of FIG. 1.

As illustrated in FIG. 5, in the groove region I the electric field is distributed about in the way of cosine function of $y$, and in the parallel plate region II the electric field decreases in the way of exponential function of $y$ as it gets farther from the center. In other words, the electromagnetic wave between the two sheets of conductors takes the form of a surface wave. That is to say, the energy is concentrated near the groove region and the density of the transmission energy decreases as it gets farther from the grooves.

Now we will explain why the field shows this distribution with the transverse resonance method. Let us consider a case where electric wave is transmitted in this line in the $z$ direction with phase wavelength $\lambda g$. The form of the electric field in his case is the same as that in a resonator that is obtained when conductive plates are inserted in the $z$ direction normal to the $z$ axis with intervals of $\lambda g/2$. Consider the electromagnetic field in the region II at the time the electric field is excited in the y-direction as shown in FIG. 2 in the region I in such a resonator.

The resonator then consists of two kinds of rectangular waveguides, which have a common center axis (y-axis) and the same width ($\lambda g/2$) but have different heights ($a$, $b$). The following description uses the normal modes in a rectangular waveguide that extends in $y$ direction and these modes are denoted with an upper suffix as the TE$_{mm}^R$ and TM$_{mm}^R$ for distinction.

When the resonator is excited at the center in region I with an electric field that has only the $y$ component, the TM$^{11R}$ is expected to be generated in region I since this mode is the lowest among the modes that have the y- component of the electric field at the center of a rectangular waveguide. The TE$_{11}^R$ mode and higher modes TM$_1^R$, $2p+1$, TE$_1^R$, $2p+1$ ($p=1, 2, 3 \ldots$) are also expected to occur because of the irregularity at the boundary between regions I and II. The phase constant in the y-direction in TM$_{11}^R$ and TE$_{11}^R$ modes for the transmission in the y-direction may be considered to have the value of zero or a value near to it. On the other hand, with regard to the modes in region II excited by the TM$_{11}^R$ and TE$_{11}^R$ modes in the region I it is considered that because of the symmetry of the construction, TM$_1^R$, $2n$-1, TE$_1^R$, $2n=1$ ($n=1, 2, 3 \ldots$) will be induced.

Of these modes, the TM$_{11}^R$ mode and TE$_{11}^R$ mode are the lowest order modes. When these are in the condition of cut-off in the y-direction, energy does not flow out from region II, and resonance can be expected at a proper frequency. The resonant modes correspond to the transmission modes having a transmission wavelength $\lambda g$ in the z-direction at the resonant frequencies.

The assumption that TM$_{11}^R$ mode and TE$_{11}^R$ mode are in the condition of cut-off in the y-direction in region II may be explained as follows:

The TM$_{11}^R$ and TE$_{11}^R$ modes are degenerate and have the same wavenumber in the same region.

Now let the phase constants of these modes in the $x$-, $y$- and $z$-directions in the regions I and II be represented by $k_x^I$, $k_y^I$, $k_z^I$, $k_x^{II}$, $k_y^{II}$, $k_z^{II}$ respectively. Then the relations between phase constants are given as follows.

$$(2\pi/\lambda_{02} = k_x^{I2} + k_y^{I2} + k_z^{I2} \quad (1)$$
$$(2\pi/\lambda_0)^2 = k_x^{II2} + k_y^{II2} + k_z^{II2} \quad (2)$$

where $\lambda_0$ is the wavelength in free space of the applied waves.

In region I, $$kx = (\pi/b) \quad (3)$$
$$kz = (2\pi/\lambda g) \quad (4)$$

As $ky$ is considered extremely small as compared with $kx$ and $kz$ the following approximate equation is obtained.

$$(2\pi/\lambda_0)^2 = (\pi/b)^2 + (2\pi/\lambda g)^2 \quad (5)$$

Similarly in region II, $$kx = (\pi/a) \quad (6)$$
$$kz = (2\pi/\lambda g) \quad (7)$$

and hence $$(2\pi/\lambda_0)^2 = (\pi/a)^2 + ky^2 + (2\pi/\lambda g)^2 \quad (8)$$

If $ky$ is obtained from the above equations 5 and 8, $ky$ is an imaginary number as shown below.

$$ky = \pm j\sqrt{(\pi/a)^2 - (\pi/b)^2} \quad (9)$$

This means that the modes are in the condition of cut-off in the y-direction. In this case of the lowest resonant mode, the distribution in the y-direction of electromagnetic field in region II is given by an exponential function as given by $$\exp[-\sqrt{(\pi/a)^2 - (\pi/b)^2}|y|]$$

The resultant electric field of the lowest resonance is shown in FIG. 2 and the distribution of the y-component of the electric field is shown in FIG. 5. This as a perturbed TE$^{10}$ mode of an ordinary rectangular waveguide but as the field is not uniform and has a maximum in the $y$ direction, we denote this mode as the TE$^{11}$ mode in the transmission line of this invention.

Here we have dealt with the parallel plates which have rectangular grooves, but we can expect that the shape of the grooves are not limited as long as the distance between the plates is larger at the center than that at the parallel plane plates.

FIG. 6 shows another embodiment of the microwave transmission line of this invention. Two sheets of metal plates 1' and 2' are facing each other. These metal plates have a concave surface 3' and 4' in the neighborhood of the center of their opposed surfaces. These plates are arranged symmetrical to the $y$ axis.

Further analysis on the resonant modes in the transverse resonance shows that the transmission line may transmit the higher modes, $TE_{2m-1, n}$ and $TM_{2m-1, n}$, where $2m-1$ corresponds to the changes of the electromagnetic field on the $x$ axis and $n$ corresponds to the changes on the $y$ axis.

The above analysis was made on the transmission line, which has the infinitely wide conductor plates but the practical line should have finite width. In this practical case, all modes cannot be transmitted with a low loss. There are two categories of the modes. The modes that have the field distribution attenuating in the $y$ direction as shown in FIG. 5 in the parallel plate region does not suffer much change due to the finite width of the conductor plates. On the other hand the modes that have the sinusoidal field distribution in the $y$ direction in the parallel plate region have infinite total propagation energy just like the uniform plane wave in free space and suffer much transmission loss due to the finite width of the conductor plates.

On certain conditions of the dimensions of the transmission line only the $TE_{11}$ and $TM_{11}$ modes belong to the former category of the modes and any other modes belong to the latter category.

As a result of analysis, only the fundamental modes $TE_{11}$ and $TM_{11}$ are transmitted with a low loss in the $z$-direction, if the dimensions in FIG. 1 satisfy the following conditions, $$a > b/3 \quad (10)$$

$$1/a^2 = 1/b^2 < 1/c^2 \quad (11)$$

Equation 10 relates to the first suffix $2m-1$ in the $TE_{2m-1,n}$ and $TM_{2m-1,n}$ modes. If Equation 10 is satisfied, only $TE_{1,n}$ and $TM_{1,n}$ are transmitted with a low loss.

Under Equation 11 only the $TE_{11}$ and $TM_{11}$ modes are transmitted with a low loss among the $TE_{1,n}$ and $TM_{1n}$ modes.

Consequently, if both Equations 10 and 11 are satisfied at the same time, there exist only the fundamental modes of $TE_{11}$ and $TM_{11}$. FIG. 7 illustrates these conditions. In FIG. 7 the center of the transmission line located on the origin O and points A and B show the crosspoint of the $x$ axis and the plates. The location range of the groove corners P of the transmission line satisfying both equations is shown by the hatched area. The straight lines 10 show $|x|=b/6$ and the curves 11 show $1/x^2 - 1/y^2 = 4/b^2$, corresponding to Equations 10 and 11 respectively. In other words, if the point P is within the hatched area both Equations 10 and 11 are satisfied and the higher order modes except the $TE_{11}$ and $TM_{11}$ modes have the sinusoidal change in the parallel plate region and are not transmitted with a low loss in this line.

FIG. 8 shows examples of the supporting device for the conductor plates of the microwave transmission line shown in FIGS. 1 and 6. FIG. 8A shows a supporting device for the conductor plates 1 and 2 having grooves 3 and 4 shown in FIG. 1, and FIG. 8B shows a supporting device for the conductor plates 1' and 2' having concave surfaces 3' and 4' shown in FIG. 6. These conductor plates are supported in the neighborhood of both edges with supporting rods 5 of dielectric material at intervals in the transmission direction.

FIGS. 9A and B show another example of the supporting device for the microwave transmission line of this invention. In these examples the parallel edges of the two conductor plates are continuously supported by fixing thereto plates of a dielectric material 6 and the line has a construction such that the interior between the two plates is closed.

By supporting the conductor plates continuously like this, it is possible to increase the strength of the support and at the same time to obtain a uniform transmission line, reflection of the waves in the line from the supports being eliminated. Furthermore, as the interior between the two sheets of metal plates is closed with plates of a dielectric material, the entry of dust and rain water into the interior can be avoided.

Since the practical transmission line of this invention has a finite width, a part of the energy radiates from the openings on both sides and it may be used as a leaky waveguide. The beam of this radiation has a maximum value in the horizontal direction, when the two conductor plates have the same width, the direction of the beam can be controlled by making the upper and lower structures asymmetrical.

FIG. 10 shows examples of such structures. In FIG. 10A one of the two conductor plates 7 has its side edges 8 slanted upwards. In FIG. 10B, the lower metal plate 9 has a larger width than the upper metal plate 1. In these cases, the radiation beam is slanted upward. The transmission line of this invention may be used as a leaky waveguide for communication, radar systems, etc. and its usefulness for practical purposes is enhanced by readily making its radiation directivity controllable in this way.

FIGS. 11, 12, 13 and 14 illustrate a few obvious methods of introducing the fundamental modes into the microwave transmission line of this invention.

As previously noted the fundamental $TE_{11}$ mode exists in the transmission line when the electric field is excited in the $y$-direction. Further, as previously stated, the $TE_{11}$ mode of this transmission line is similar to the $TE_{10}$ mode of the rectangular waveguide which has an electric field excited in the $y$ direction. Therefore, one obvious method to excite the $TE_{11}$ mode in the present waveguide is to use a horn as illustrated in FIG. 11A which gradually changes shape from the rectangular waveguide excited by normal means with the $TE_{10}$ mode to the shape of the grooved transmission line of the present invention.

FIG. 11B illustrates another method of launching the $TE_{11}$ mode from the rectangular waveguide. This launcher is similar to a directional coupler of a waveguide component. A suitable length of the coupled rectangular section is necessary in order to obtain a complete transfer of waves from the rectangular waveguide to the transmission line of the present invention via the coupling holes 15.

FIGS. 12A and B illustrate common methods of exciting an electric field in the $y$ direction by use of parallel wires.

FIG. 12A shows a method launching the $TE_{11}$ mode by use of a dipole antenna 16 at the end of the parallel wires.

FIG. 12B similarly accomplishes this by connecting the parallel wires to the edges of the slot 17 in the conductor plate 18 which is placed normal to the propagation or $z$ axis. These launchers do not have as good efficiency as those from a rectangular waveguide as shown in FIGS. 11A and B because a certain amount of energy is radiated backwards.

FIGS. 13A and B illustrate a method of exciting or launching the $TE_{11}$ mode from a coaxial cable. A coaxial cable 19 is placed along the center axis of propagation through the conductor plate 18. As similarly shown in FIG. 12A, a dipole antenna 20 is placed at the end of the coaxial cable in order to excite an electric field in the $y$ direction. This dipole antenna is of a common type dipole antenna which is fed from a coaxial cable as is shown in greater detail in FIG. 13B. The outer conductor 21 is bisected near the antenna as shown by slots 22. Each segment 23 of the dipole is respectively attached to opposing bisected outer conductor sections 24. The inner conductor 25 is shorted to one of the outer conductor sections 24. The dipole is inserted into the transmission line a distance of about $\lambda g/4$ or a quarter wavelength from the conductor plate 18. This type of launcher has almost the same efficiency as the launchers utilizing the rectangular waveguide.

FIG. 14 illustrates one of the more obvious methods of launching the $TM_{11}$ mode by using a coaxial cable. Here the outer casing 21 of the coaxial cable 19 is connected to the transverse conductor plate 18 while the center conductor 25 is permitted to extend beyond the plate into the transmission line along the $z$ axis thus exciting the fields in the proper direction to launch the $TM_{11}$ mode of the transmission line of the present invention as would be expected by reason of the positioning to the extended probe of the center conductor 25. The above art of exciting the particular desired wave in the transmission line is accomplished merely by studying the wave pattern and then using a common method of excitation as done above and as more fully disclosed on page 380 of Fields and Waves in Modern Radio, Second Edition by Ramo and Whinnery.

We claim:

1. A microwave transmission line which includes two metal conductor plates insulatingly mounted at a uniform distance from each other, each plate having an inwardly facing channel facing each other and extending longitudinally of the transmission line to transmit a polarized wave in the form of a surface wave having an electric field parallel to said plates on the central axis between the conductors.

2. A microwave transmission line of claim 1, which is characterized in that said two metal conductor plates each have an angular channel which are placed symmetrical to the direction of transmission.

3. A microwave transmission line of claim 1, which is characterized in that said two metal conductor plates each have a channel of concave surfaces on their inner faces opposed to each other and are placed symmetrical to the direction of transmission.

4. A microwave transmission line of claim 3, which is characterized in that the form of said channel cross section is suitably selected to tranmsit $TE_{11}$, $TM_{11}$ modes only.

5. A microwave transmission line of claim 1 characterized in that said distance is ($a$) between the two sheets of metal conductor plates, the distance ($b$) is the greatest distance between said channels and the distance ($c$) is the width of the channels and wherein these distances satisfy the relationships of $$a > b/3$$
$$1/a^2 - 1/b^2 < (1/c)^2$$

so that only $TE_{11}$ and $TM_{11}$ modes are transmitted.

6. A microwave transmission line of claim 1, which is characterized in that the two metal conductor plates are supported in spaced relation by rods of a dielectric material at intervals in the direction of transmission.

7. A microwave transmission line of claim 1, which is characterized in that the parallel side edges of the two metal conductor plates are continuously supported in spaced relation by plates of a dielectric material and the interior between the two metal conductor plates is closed.

8. A microwave transmission line of claim 7, which is characterized in that said side edges are covered with a material which absorbs electric waves so as to eliminate outward radiation.

9. A microwave transmission line of claim 1, which is characterized in that the side edges of at least one of said metal conductor plates are bent slantwise toward the other, so that the beam direction is inclined when a part of the electric wave transmitted is radiated outwards.

10. The microwave transmission line of claim 9 wherein a dielectric material continuously connects and supports the adjacent edges of said two metal conductor plates.

11. The microwave transmission line of claim 9 wherein at least one side edge of said metal conductor plates is a greater distance from said central axis than the opposite metal conductor plate side edge.

12. The microwave transmission line of claim 1 wherein at least one side edge of said metal conductor plates is a greater distance from said central axis than the opposite metal conductor plate side edge.

13. The microwave transmission line of claim 12 wherein a dielectric material continuously connects and supports the adjacent edges of said two sheets of metal conductor plates.

14. The microwave transmission of claim 13 wherein said side edges are covered with a material which absorbs electric waves to eliminate outward radiation.

15. A transmission line comprising two parallel conductor plates extending in the direction of transmission and each having symmetrically uniform grooves facing each other and in the neighborhood of the central part of the cross section normal to the transmission line of said parallel conductor plates to transmit electromagnetic waves of such an electromagnetic field distribution that the transmission electromagnetic field energy polarized in parallel to said parallel plates is concentrated in the central groove region and decreases in the way of exponential functions as it gets farther from the center.

16. A transmission line as claimed in claim 15 in which the grooves have a rectangular shape having a width $c$ and, the distance between the bottoms of said rectangular grooves being $b$ and the distance between the parallel plates $a$, there exist relations of $a$ is greater than $b/3$ and $1/a^2 - 1/b^2$ is less than $1/c^2$, modes of higher orders other than $TE_{11}$ and $TM_{11}$ whereby modes which have sinusoidal field distributions in the direction parallel with said conductor plates and normal to the axis of propagation are given a very large transmission loss where the width of the parallel conductor plates is finite.

17. A transmission line as claimed in claim 15 which includes dielectric material supporting the edges of said conductor plates.

18. A transmission line as claimed in claim 15 in which said two parallel conductor plates have different widths, so that the direction of the radiation beam leaking from the edges is inclined with respect to the direction parallel to the parallel plates.

19. A transmission line as claimed in claim 15 in which the grooves are concave.

References Cited by the Examiner

T. Nakahara, N. Kurauchi, "Transmission Modes in the Grooved Guide," in Sumitomo Electrical Technical Review, No. 5, January 1965, pp. 65–71.

F. J. Tischer, "The Groove Guide, a Low-Loss waveguide for Millimeter Waves," in IEE Transactions on Microwave Theory and Techniques, vol. MTT-11, No. 5, September 1963, pp. 291–296.

HERMAN KARL SAALBACH, *Primary Examiner.*

L. ALLAHUT, *Assistant Examiner.*